Figure 1:
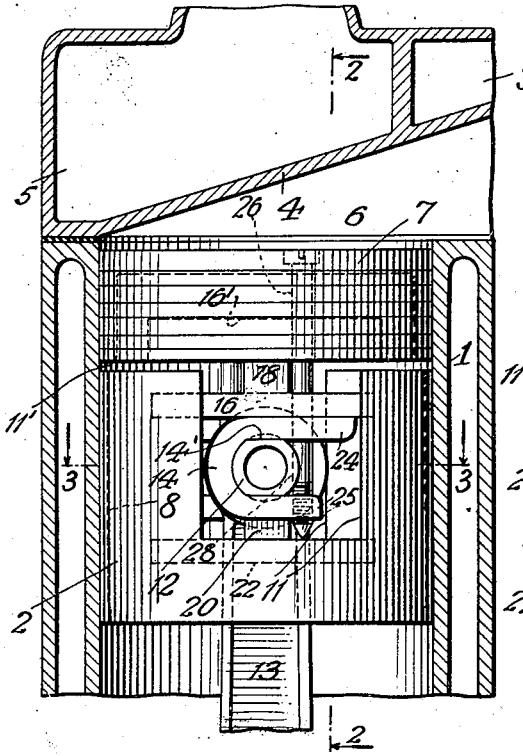

Nov. 5, 1929.  P. F. GODSTREY  1,734,085

REMOVABLE PISTON

Original Filed Feb. 29, 1928

INVENTOR.
PERCIVAL F. GODSTREY.
BY *Sheffield & Betts*
HIS ATTORNEYS.

Patented Nov. 5, 1929

1,734,085

UNITED STATES PATENT OFFICE

PERCIVAL FREELAND GODSTREY, OF NEW YORK, N. Y., ASSIGNOR TO QUICKIN PISTON COMPANY, INC., A CORPORATION OF NEW JERSEY

REMOVABLE PISTON

Application filed February 29, 1928, Serial No. 257,923. Renewed November 15, 1928.

This invention relates to internal combustion engines, pumps, air-compressors and the like, and more particularly to the pistons thereof and means for removably connecting the pistons to the wrist pins.

In the usual design of internal combustion engines, pumps, air-compressors and the like, such as, for example, an automobile engine, when it is desired to remove the pistons from the cylinders for any reason, it is necessary to drain the oil from the crankcase and to remove so much of the crank case as is necessary to furnish access to the crank bearing at the lower end of the connecting rod. The connecting rod is disconnected from the crank shaft and pulled through the bottom of the cylinder, thus removing the piston which may be thereafter disconnected from the wrist pin if it is so desired. It will be appreciated from the above description that this method of removing the pistons is very laborious and involves considerable time and expense.

The principal object of the present invention, therefore, is to provide means whereby the piston may be withdrawn through the cylinder head of the engine in such a manner as to avoid the necessity of draining the oil from the crank case and removing a portion or all of the crank case when it is desired to inspect, repair or replace either the piston or the piston rings or to remove these parts for any other reason.

A further object of the invention is to provide simple and effective means for removably connecting the piston to the wrist pin in such a manner that the piston may be removed from the cylinder without disconnecting the connecting rod from the crank shaft.

A still further object of the invention is to provide a piston of improved construction adapted to support the wrist pin and to reinforce the walls of the piston adjacent its lower end.

Another object of the invention is to provide means for preventing the wrist pin from projecting beyond the side walls of the piston and thus scoring the cylinder walls.

Another object of the invention is to provide a wrist pin of such construction that it serves as an internal strut to support the side walls of the piston.

Further objects of the invention will be apparent from the drawing and the description given below which describes a preferred embodiment of the invention.

Figure 2:
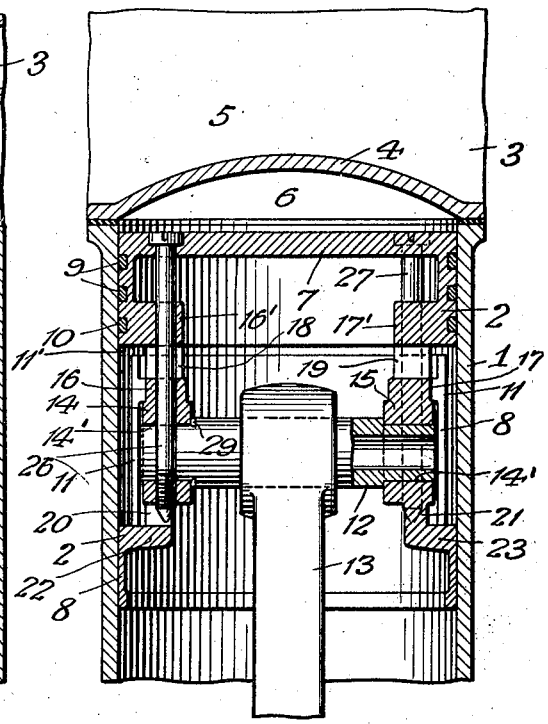
Figure 3:
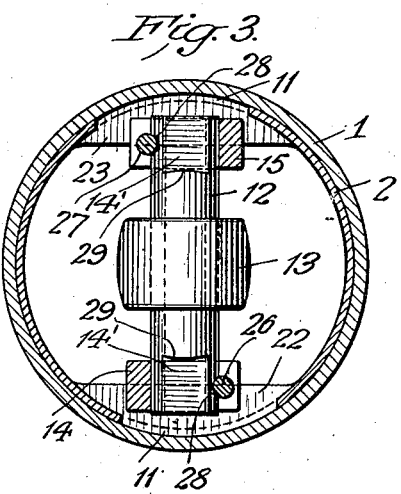

In carrying out the invention, the usual type of connecting rod is employed and is adapted to oscillate about the wrist pin which is rigidly supported in suitable brackets located within the piston and formed integral therewith. Two removable pins normally hold the wrist pin in position in the brackets. After the cylinder head has been removed these pins may be withdrawn and the piston turned slightly to disengage the wrist pin from the brackets after which the piston may be withdrawn through the head of the cylinder leaving the wrist pin and connecting rod in the cylinder. For a more detailed description of the invention, reference may be had to the accompanying drawing illustrating a preferred embodment of the invention in which Fig. 1 is a cross-sectional view of the upper portion of an engine cylinder showing my improved type of piston therein;

Fig. 2 is a cross-sectional view taken substantially on the lin 2—2 of Fig. 1; and Fig. 3 is a cross-sectional view taken substantially on the line 3—3 of Fig. 1.

In the drawing the numeral 1 indicates the cylinder of an internal combustion engine, such as, for example, an automobile engine, in which a piston 2, embodying the present invention, is adapted to reciprocate in the usual manner. The cylinder head 3 of the engine is divided by means of an inclined wall 4 into two compartments comprising a water jacket 5 and a combustion chamber 6 communicating with the cylinder 1 and having located therein the spark plug and inlet and exhaust valves (not shown).

The piston 2 comprises a head 7 and side walls 8 the upper portion of which is preferably made thicker than the lower portion as shown and is adapted to house the piston rings 9 and an oil ring 10. Two diametrically opposite openings 11 of substantial size are made in the sides of the piston 2 for the purposes of lessening its weight, reducing friction between the piston and the cylinder walls and to provide access to the interior of the piston. The piston 2 is divided into upper and lower portions by means of an opening 11' which extends around the circumference of the piston. These two portions of the piston are held together by the internal structure of the piston as described hereinafter. The purpose of the opening 11' is to provide an access whereby the cylinder lubricating oil may flow into the interior of the piston to lubricate the wrist pin.

The wrist pin 12, upon which the connecting rod 13 is rotatably and slidably mounted, is hollow and has its ends flattened to form bearing surfaces 14' as shown more clearly in Fig. 1. The means for supporting the wrist pin 12 may be, and preferably are, formed integral with the piston 2 and may be described as follows. Substantially U-shaped supports or brackets 14 and 15 are formed integral with the lateral braces or struts 16 and 17, which extend across the inside of the piston 2 as indicated more clearly in Fig. 1. Legs 18 and 19 are formed integral with the struts 16 and 17 respectively and also with the lateral struts 16' and 17' connected with the upper portion of the side walls as illustrated. The lower part of the brackets 16 and 17 are connected by means of the legs 20 and 21 to the lateral struts 22 and 23 which are similar to the struts 16 and 17 and like them extend across the inside of the piston. These lower struts thus reinforce the lower portion of the piston and aid in maintaining it perfectly round when subjected to the normal operating heat of the engine. The supporting structure for the wrist pin 12 thus forms an integral part of the piston 2 and connects the upper and lower parts thereof together so that the piston may, therefore, be readily cast as one piece.

Each of the U-shaped brackets 14 and 15, which have their respective "open" ends pointing in opposite directions, comprises two parallel branches, an upper 24 and a lower 25, the former of which projects slightly beyond the latter as shown in Fig. 1. The flattened ends 14 of the wrist pin 12 are adapted to be inserted between the branches 24 and 25 and to facilitate the entry therein the ends of these branches may be beveled or rounded as illustrated in Fig. 1.

The wrist pin 12 is preferably held in position in the brackets 14 and 15 by means of the locking pins 26 and 27 which extend from the head 7 of the piston, in which they are countersunk as shown to lie flush with the upper surface thereof, to the lower branches 25 of the brackets in which they are threaded. The pins 26 and 27 are preferably tapered so that as they are screwed into the branches 25 they will have a tendency to wedge in the upper branches 25 and the struts 16, 17, 16', and 17' through which they pass, thus causing them to be held firmly in position. The ends of the wrist pin 12 have recesses 28 cut therein which are adapted to receive the locking pins 26 and 27 in order to prevent the wrist pin from sliding longitudinally and possibly projecting beyond the walls of the piston 2 thus causing the walls of the cylinder to be scored as the piston reciprocates. The provision of the flattened ends on the wrist pin 12 leaves shoulders 29 thereon which contact with the inside surfaces of the brackets 14 and 15 and further prevent the wrist pin 12 from sliding longitudinally. These shoulders are rounded as shown in Fig. 3 so that the piston may be readily removed from the wrist pin 12 as hereinafter described.

It will be appreciated from the above description of the wrist pin that the shoulders 29 abutting against the internal structure of the piston, and the locking pins 26 and 27 positioned in their respective grooves in the wrist pin and passing through the upper and lower branches of the wrist pin supports, cooperate to support the side walls of the piston thus enabling the wrist pin to function as an internal strut in addition to its other functions.

When it is desired to take the piston 2 out of the cylinder 1 the cylinder head 3 is removed thus exposing the top of the piston. The locking pins 26 and 27 are unscrewed from the lower branches 25 of the brackets 14 and 15 and drawn upward until they are clear of the wrist 12 after which the piston may be rotated, by pushing on the locking pins, until the upper branches 24 of the brackets are clear of the wrist pin when the piston may be lifted out of the cylinder. It may be desirable to remove the locking pins 26 and 27 entirely out of the piston and insert small rods in their places, which rods are provided with bent-over ends adapted to hook over the under surfaces of the branches 24 to facilitate the lifting of the piston.

In replacing the piston in the cylinder it is pushed downward until the projecting portions of the upper branches 24 strike the top of the wrist pin after which the piston is rotated until the wrist pin rests in its normal position in the brackets 14 and 15. The locking pins 26 and 27 are then screwed into position and the cylinder head 3 replaced.

Having thus described this form of the invention, it is to be understood that the invention is not limited to the details of form and the arrangement of parts shown since it will be apparent to one skilled in the art that various changes may be made without departing from the spirit and scope of the invention as set forth in the appended claims.

What I claim and desire to secure by Letters Patents is:

1. In combination, a connecting rod, a wrist pin, a piston provided with means adapted to support said wrist pin within said piston, said means having open sides facing in opposite directions whereby said piston may be connected to, or disconnected from, said wrist pin by a turning movement thereof, and means for locking said wrist pin in said supporting means.

2. In combination, a connecting rod, a wrist pin, a piston provided with substantially U-shaped brackets adapted to accommodate the ends of the wrist pin to support the same within the piston, the open ends of said brackets facing in opposite directions whereby said piston may be connected to, or disconnected from, said wrist pin by a turning movement thereof, and locking pins adapted to hold said wrist pin in said brackets.

3. In combination, a connecting rod, a wrist pin, a piston provided with substantially U-shaped brackets comprising upper and lower branches adapted to accommodate the ends of the wrist pin to support the same within the piston, the open ends of said brackets facing in opposite directions whereby said piston may be connected to, or disconnected from, said wrist pin by a turning movement, and locking pins removable through the head of the piston and extending into said lower branches to hold said wrist pin in said brackets.

4. In combination, a connecting rod, a wrist pin having parallel bearing surfaces and recesses at its ends, a piston provided with substantially U-shaped brackets comprising upper and lower parallel branches adapted to accommodate the ends of the wrist pin to support the same within the piston, the open ends of said brackets facing in opposite directions whereby said piston may be connected to, or disconnected from, said wrist pin by a turning movement, and locking pins removable through the head of the piston and extending into said lower branches and engaging said wrist pin in said recesses to hold the wrist pin in said brackets.

5. In combination, a connecting rod, a wrist pin having parallel bearing surfaces and recesses at its ends, a piston divided into upper and lower portions by a circumferential opening through the piston wall, said portions being connected by the internal structure of the piston comprising, substantially U-shaped brackets provided with upper and lower branches adapted to accommodate the ends of the wrist pin to support the same within the piston, the open ends of said brackets facing in opposite directions whereby said piston may be connected to, or disconnected from, said wrist pin by a turning movement, and locking pins removable through the head of the piston and extending into said lower branches to hold said wrist pin in said brackets.

6. In combination, a connecting rod, a wrist pin slidably and rotatably mounted in said connecting rod and having parallel bearing surfaces and recesses at its ends, a piston divided into upper and lower portions by a circumferential opening through the piston wall, said portions being connected by the internal structure of the piston comprising, substantially U-shaped brackets provided with upper and lower branches adapted to accommodate the ends of the wrist pin to support the same within the piston, said upper branches projecting slightly beyond said lower branches, the open ends of said brackets facing in opposite directions whereby said piston may be connected to, or disconnected from, said wrist pin by a turning movement, and locking pins removable through the head of the piston and extending into said lower branches and engaging said wrist pin in said recesses to hold the wrist pin in said brackets.

7. In combination, a connecting rod, a wrist pin having parallel bearing surfaces and recesses at its ends, a piston provided with substantially U-shaped brackets comprising upper and lower parallel branches adapted to accommodate the ends of the wrist pin to support the same within the piston, the open ends of said brackets facing in opposite directions whereby said piston may be connected to or disconnected from said wrist pin by a turning movement and means for locking said wrist pin in said brackets.

PERCIVAL FREELAND GODSTREY.